United States Patent
Park et al.

(10) Patent No.: US 9,425,423 B2
(45) Date of Patent: Aug. 23, 2016

(54) SCREEN FOR DISPLAYING INFORMATION FOR AN OPTICAL DEVICE

(75) Inventors: Il Ho Park, Hongseong-gun (KR); Woo Bin Im, Hongseong-gun (KR); Kwang Hoon Jun, Hongseong-gun (KR)

(73) Assignee: NEOVIEWKOLON CO., LTD., Hongseong-gun, Chungcheongnam-do (KR)

( * ) Notice: Subject to any disclaimer, the term of this patent is extended or adjusted under 35 U.S.C. 154(b) by 0 days.

(21) Appl. No.: 14/009,903

(22) PCT Filed: Apr. 6, 2012

(86) PCT No.: PCT/KR2012/002638
§ 371 (c)(1),
(2), (4) Date: Oct. 4, 2013

(87) PCT Pub. No.: WO2012/138181
PCT Pub. Date: Oct. 11, 2012

(65) Prior Publication Data
US 2014/0021452 A1    Jan. 23, 2014

(30) Foreign Application Priority Data
Apr. 6, 2011   (KR) .......... 10-2011-0031540

(51) Int. Cl.
| | |
|---|---|
| *H01L 29/08* | (2006.01) |
| *H01L 51/52* | (2006.01) |
| *H04N 5/232* | (2006.01) |
| *G03B 13/24* | (2006.01) |
| *G03B 17/20* | (2006.01) |
| *G09G 3/32* | (2016.01) |

(52) U.S. Cl.
CPC ............ *H01L 51/52* (2013.01); *H04N 5/23293* (2013.01); *G03B 13/24* (2013.01); *G03B 17/20* (2013.01); *G09G 3/3208* (2013.01); *G09G 2300/02* (2013.01)

(58) Field of Classification Search
CPC .......................... H01L 51/5271; H01L 51/52
USPC .......................................................... 257/40
See application file for complete search history.

(56) References Cited

U.S. PATENT DOCUMENTS

| | | | |
|---|---|---|---|
| 5,703,436 A | 12/1997 | Forrest et al. | |
| 2008/0106628 A1* | 5/2008 | Cok et al. ................. | 348/333.01 |
| 2009/0267490 A1* | 10/2009 | Birnstock et al. ............ | 313/504 |
| 2010/0084648 A1* | 4/2010 | Watanabe ......... | H01L 29/66969 257/43 |
| 2010/0289016 A1* | 11/2010 | Ha ...................... | H01L 51/5234 257/40 |

FOREIGN PATENT DOCUMENTS

KR   10-2002-0087714 A   11/2002
KR   10-2003-0044188 A    6/2003

OTHER PUBLICATIONS

International Searching Authority, International Search Report for PCT/KR2012/002638 dated Nov. 5, 2012.

* cited by examiner

*Primary Examiner* — Ajay K Arora
(74) *Attorney, Agent, or Firm* — Sughrue Mion, PLLC

(57) ABSTRACT

Disclosed is a screen for displaying information for an optical device which is arranged within an optical path of an optical device. The screen for displaying information includes a transparent organic light-emitting diode (TOLED) which emits light in accordance with power and an input control signal.

18 Claims, 4 Drawing Sheets

SCREEN FOR DISPLAYING INFORMATION FOR AN OPTICAL DEVICE

CROSS REFERENCE TO RELATED APPLICATIONS

This application is a National Stage of International Application No. PCT/KR2012/002638 filed Apr. 6, 2012, claiming priority based on Korean Patent Application No. 10-2011-0031540 filed Apr. 6, 2011, the contents of all of which are incorporated herein by reference in their entirety.

TECHNICAL FIELD

The present invention relates to a screen for displaying information for an optical device, and more particularly, to a technique of configuring a screen for displaying information which is arranged within an optical path of an optical device and includes a transparent organic light-emitting device (TOLED).

BACKGROUND ART

In optical devices, such as photographing devices, for example, a camera, a camcorder, or the like, a distance measuring equipment, a magnifying glass of various kinds of telescopes, and the like, a microscope which observes micro objects, and the like, a shape, a position, a distance, a size, and the like of an optically observed object are transferred to a user's eye through an optical path of the optical devices. In this specification, the optical path may be defined as a path from a lens of the optical device to a check window, such as a view finder.

The optical path may be provided with screen parts which may display optical information of an object, such as a device set-up value of the optical device and a focus or a position such as a distance of an optically observed object.

For example, a camera which is a representative example of the optical device includes a finder screen configured to display a focus of a subject, which is an optically observed object, within an optical path between a lens and a view finder and a set-up display screen configured to display device set-up values of the camera.

Hereinafter, a structure that screen parts are installed in a single-lens reflex camera (hereinafter, referred to as a "SLR camera") which is a kind of camera will be described in detail.

As illustrated in FIG. 1, a general SLR camera vertically reverses an image of a subject input though a lens 103 through a reflecting mirror 110 inside a camera body 101, passes the vertically reversed image through a finder screen 120 and a set-up display screen 130 which are screen parts, reverses the vertically reversed image to a normal position again while passing through a pentaprism 140, and then transfers the normally reversed image to a photographer's eye through a view finder 150.

In this configuration, the finder screen 120, which focuses a subject, has a structure in which a single focus pattern or a plurality of focus patterns (not illustrated) are printed on a light-transmissive plate.

The finder screen 120 is electrically connected to a shutter button (not illustrated) and a controller (not illustrated) of the camera body 101 so as to be able to transmit a control signal to each other, and light-emits the corresponding focus pattern (not illustrated) toward a subject by a control of the controller (not illustrated) during a process of allowing a photographer to press the shutter button (not illustrated) so as to enable the photographer to confirm a focus.

Meanwhile, the set-up display screen 130 displays device set-up information to enable a photographer to confirm device set-up values, such as exposure and photographing sensitivity, through the view finder 150. The set-up display screen 130 has a structure in which an information display pattern (not illustrated) on which various types of photographing information or photographing set-up values are displayed is printed on the light-transmissive plate.

The set-up display screen 130 is electrically connected to the shutter button (not illustrated), an aperture dial (not illustrated), an exposure time control dial (not illustrated), a sensitivity control button (not illustrated), a controller (not illustrated), and the like, to be able to transmit control signals to each other.

Therefore, the corresponding photographing information, the photographing set-up values, or the like is light-emitted on the information display pattern (not illustrated) by the control of the controller (not illustrated) during a process of allowing a photographer to press the shutter button (not illustrated) halfway or operate the aperture dial (not illustrated), the exposure time control dial (not illustrated), the sensitivity control button (not illustrated), and the like, such that the photographer may confirm the corresponding photographing information, the photographing set-up values, or the like.

However, since the screen parts which are installed in the optical device, such as a conventional SLR camera are provided in plural, such as the finder screen and the set-up display screen, the number of parts is increased, such that a mechanical design inside the optical device may be complicated and a mechanical restriction and parts cost may be increased.

Further, a volume of the finder screen and the set-up display screen which are installed in the optical device, such as the conventional SLR camera, must be thick enough to form the focus pattern and the information display pattern which are a light-emitting pattern. Therefore, there is a problem in that the optical device may be structurally and mechanically restricted at the time of installing the screen parts therein.

Further, in order to avoid a mutual interference of the light-emitting pattern (for example, the focus pattern and the information display pattern as described above) between the respective screen parts, there is a problem in that a display region of the light-emitting pattern is restricted.

Further, each of the screen parts is to form the light-emitting patterns on the light-transmissive plate. In this case, since the light-emitting pattern is positioned on the optical path, there is a problem in that visibility of an optically observed object may be deteriorated.

Meanwhile, the finder screen and the set-up display screen which are installed in the optical device, such as the conventional SLR camera, may not implement various colors due to characteristics of a light-emitting device. As a result, an information display depending on emission of light is merely transferred to a user and thus the user does not carefully recognize the corresponding information, and the like, such that usability of the optical device may be reduced.

DISCLOSURE

Technical Problem

Accordingly, an object of the present invention is to provide a screen for displaying information for an optical device based on a TOLED capable of removing a mechanical restriction inside the optical device and saving parts cost by displaying optical information on device set-up values of the optical device or an optically observed object on a single screen part.

Further, another object of the present invention is to provide a screen for displaying information for an optical device based on a TOLED capable of removing a structural and mechanical restriction of a photographing device by making a volume of a screen part thin.

In addition, another object of the present invention is to provide a screen for displaying information for an optical device based on a TOLED which is free from common restraints of a light-emitting display region.

Moreover, another object of the present invention is to provide a screen for displaying information for an optical device based on a TOLED capable of preventing visibility of an optically observed object transferred to a user's eye from deteriorating.

Furthermore, another object of the present invention is to provide a screen for displaying information for an optical device based on a TOLED capable of improving usability, such as allowing a user to accurately recognize corresponding information, by implementing optical information on device set-up values of an optical device or an optically observed object in various colors.

Technical Solution

To achieve the above objects, according to the present invention, there is provided a screen for displaying information for an optical device which is arranged within an optical path of an optical device including: a transparent organic light-emitting device (TOLED) which emits light in accordance with power and an input control signal.

The screen for displaying information may include a set-up information display unit which light-emits and displays use set-up values of the optical device.

The screen for displaying information for an optical device may include an optical information display unit which light-emits and displays optical information on an optically observed object transferred through the optical path.

The screen for displaying information for an optical device may further include a set-up information display unit which light-emits and displays the use set-up values of the optical device.

The optical information display unit may be formed in one region of the screen for displaying information and the set-up information display unit may be formed in the other region of the screen for displaying information.

The optical information display unit may display focus or position information on the optically observed object.

One region of a circumference of the screen for displaying information display may be provided with an input unit to which the power and the control signal are input.

Meanwhile, the TOLED may include: a transparent substrate; a lower electrode which is formed on the substrate to receive the power and the control signal; an organic layer which is formed on the lower electrode; an upper electrode which is formed on the organic layer to receive the power and the control signal; and a light-transmissive layer which is formed between the organic layer and the upper electrode or on an upper portion of the upper electrode.

The lower electrode may be made of indium tin-oxide or indium zinc-oxide which has light transparency.

The upper electrode may be made of any one of silver (Ag), aluminum (Al), and an alloy of magnesium and silver (Mg:Ag), all of which have light transparency.

The organic layer may have a hole injection layer, a hole transporting layer, an emissive layer, an electron transporting layer, and an electron injection layer which are mutually stacked between the lower electrode and the upper electrode.

The electron transporting layer may include any one of Cs, Li, Na, K, and Ca which are metals having a low work function or may include any one of Li—Al, LiF, CsF, and $Cs_2CO_3$ which are composites thereof.

The light-transmissive layer may include any one of oxides, nitrides, and salts or include composites thereof.

The oxides may include any one of $MoO_3$, ITO, IZO, IO, ZnO, TO, $TiO_2$, $SiO_2$, $WO_3$, $Al_2O_3$, $Cr_2O_3$, $TeO_2$, and $SrO_2$.

The nitrides may include any one of SiN and AlN.

The salts may include any one of $Cs_2CO_3$, $LiCO_3$, $KCO_3$, $NaCO_3$, LiF, CsF, and ZnSe.

The TOLED may be an active matrix transparent organic light-emitting device (AM-TOLED) or a passive matrix transparent light-emitting device (PM-TOLED).

The TOLED may be a TOLED which implements at least one color.

The optical device may be any one of a photographing device, a distance measuring equipment, a magnifying glass, and a microscope.

The screen for displaying information may be provided as a flexible display.

Advantageous Effects

According to the present invention, a screen for displaying information for an optical device based on a TOLED capable of removing a mechanical restriction inside the optical device and saving parts cost by displaying optical information on device set-up values of the optical device or an optically observed object on a single screen part is provided.

Further, the screen for displaying information for an optical device based on a TOLED capable of removing a structural and mechanical restriction of a photographing device by making a volume of a screen part thin is provided.

In addition, the screen for displaying information for an optical device based on a TOLED which is free from common restraint of a light-emitting display region is provided.

Moreover, according to the present invention, the screen for displaying information for an optical device based on a TOLED capable of preventing visibility of an optically observed object transferred to a user's eye from deteriorating is provided.

Furthermore, according to the present invention, the screen for displaying information for an optical device based on a TOLED capable of improving usability, such as allowing a user to accurately recognize corresponding information, by implementing optical information on device set-up values of an optical device or an optically observed object in various colors is provided.

BEST MODE

Hereinafter, the present invention will be described in detail with reference to the accompanying drawings.

Figure 1:
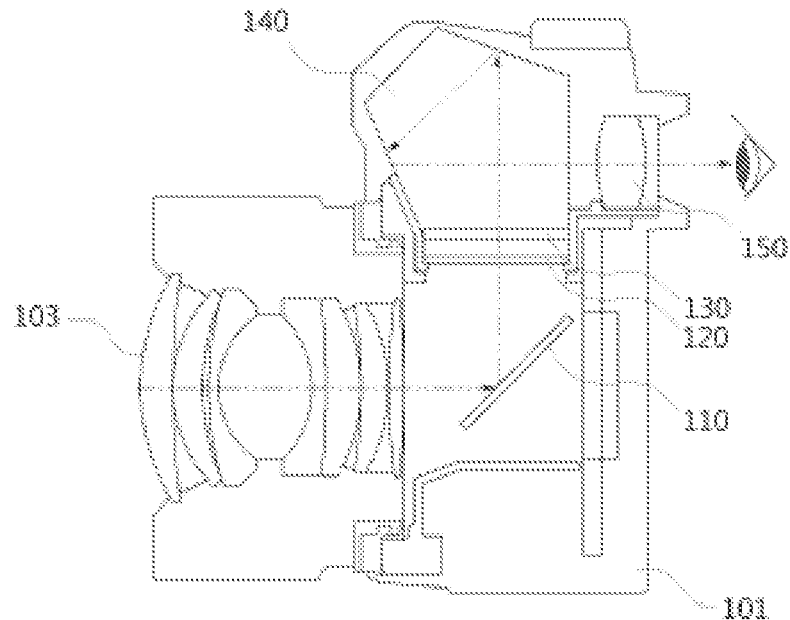
FIG. 1 is a schematic cross-sectional view of an SLR camera which is a representative example of a general optical device.
Figure 2:
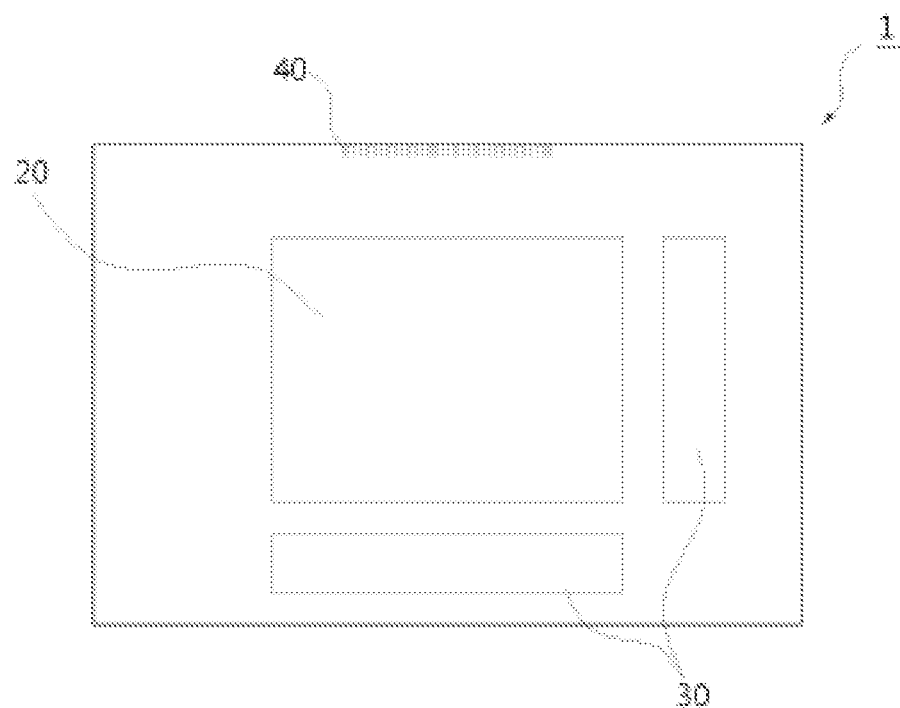
FIG. 2 is a plan view of a screen for displaying information according to the present invention.
Figure 3:
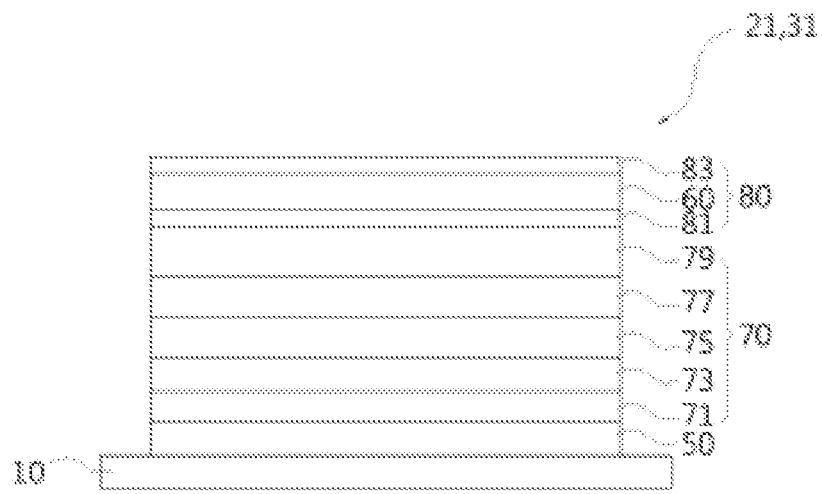
FIG. 3 is an enlarged cross-sectional view of a transparent organic light-emitting device forming the screen for displaying information of FIG. 2.

As illustrated in FIGS. 2 and 3, a screen 1 for displaying information for an optical device according to an embodiment of the present invention is a transparent organic light-emitting device (TOLED) which emits light in accordance with power and an input control signal and includes a set-up information display unit 30 which light-emits and displays set-up values of the optical device and an optical information display unit 20 which light-emits and displays optical information on an optically observed object transferred through an optical path of the optical device.

In this configuration, one region of a circumference of the screen 1 for displaying information may be provided with an input unit 40 which transfers the power and the control signal transferred from a power supply unit (not illustrated) and a controller (not illustrated) of the optical device to the optical information display unit 20 and the set-up information display unit 30.

Further, the screen 1 for displaying information may include both of the set-up information display unit 30 and the optical information display unit 20, but may include only one of the set-up information display unit 30 and the optical information display unit 20 depending on a type of the optical device.

As described above, the screen 1 for displaying information is formed based on the transparent organic light-emitting device (TOLED), in which the TOLED may include a transparent substrate 10 and a lower electrode 50, an upper electrode 60, an organic layer 70, and a light-transmissive layer 80 which are stacked on the substrate 10, as illustrated in FIG. 3.

The substrate 10 is a transparent plate-shaped member and may be provided with a hard substrate, such as transparent glass or plastic, or a flexible substrate, such as a film, to enable a user's eye to clearly confirm an optically observed object.

The lower electrode 50 is formed on the substrate 10 to be electrically connected to the input unit 40. In addition, the lower electrode 50 is an anode which is a positive (+) electrode and may be formed on the substrates 10 and 100 by a sputtering method, an ion plating method, a thermal evaporation method using an e-gun, and the like. In this case, the lower electrode 50 may use an indium tin-oxide electrode having light transparency or may also use an indium zinc-oxide electrode having light transparency.

The upper electrode 60 generally faces the lower electrode 50 and is formed on the organic layer 70 to be electrically connected to the input unit 40. The upper electrode 60 is a cathode which is a negative (−) electrode, which is opposite to the lower electrode 50 which is a positive (+) electrode. The upper electrode 60 may be made of any one selected from silver (Ag), aluminum (Al), and an alloy of magnesium-silver (Mg:Ag), all of which have light transparency.

The organic layer 70 is interposed between the lower electrode 50 and the upper electrode 60 to emit light by conduction between the lower electrode 50 and the upper electrode 60. The organic layer 70 may include a hole injection layer (HIL) 71, a hole transporting layer (HTL) 73, an emissive layer (EML) (i.e. a light-emitting layer) 75, an electron transporting layer (ETL) 77, and an electron injection layer (EIL) 79 to emit light by conduction between the lower electrode 50 and the upper electrode 60.

The organic layer 70 may be interposed between the lower electrode 50 and the upper electrode 60 by a spin coating method, a thermal evaporation method, a spin casting method, a sputtering method, an e-beam evaporation method, a chemical vapor deposition (CVD) method, and the like.

The hole injection layer 71 serves to inject holes from the lower electrode 50 and the hole transporting layer 73 serves as a mobile path of holes so as to allow holes injected from the hole injection layer 71 to meet electrons from the upper electrode 60.

The electron injection layer 79 serves to inject the electrons from the upper electrode 60 and the electron transporting layer 77 serves as a mobile path of electrons so as to allow electrons injected from the electron injection layer 79 to meet holes moving from the hole transporting layer 73 at the emissive layer 75.

The electron transporting layer 77 may be formed by doping any one of metals having a low work function and composites thereof so as to smooth the electron injection from the upper electrode 60, which may be applied regardless of whether the electron injection layer 79 is present. In this case, the metals having a low work function may include Cs, Li, Na, K, Ca, and the like and may also include Li—Al, LiF, CsF, $Cs_2CO_3$, and the like, which are composites thereof.

Meanwhile, the emissive layer 75 is interposed between the hole transporting layer 73 and the electron transporting layer 77 to emit light by the holes from the hole transporting layer 73 and the electrons from the electron transporting layer 77. That is, the emissive layer 75 emits light due to recombination of holes and electrons which meet at an interface between the hole transporting layer 73 and the electron transporting layer 77.

The light-transmissive layer 80 may be formed between the organic layer 70 and the upper electrode 60 or on an upper portion of the upper electrode 60. For example, the light-transmissive layer 80 may be formed both of an upper surface and a lower surface of the upper electrode 60 or may be formed at only one of the upper surface and the lower surface of the upper electrode 60.

That is, the light-transmissive layer 80 may include a first light-transmissive layer 81 which is formed between the organic layer 70 and the upper electrode 60 and a second light-transmissive layer 83 which is formed on the upper portion of the upper electrode 60. Preferably, the first light-transmissive layer 80 may be formed between the electron injection layer 79 of the organic layer 70 and the upper electrode 60 and may also be formed in the electron injection layer 79 itself. Further, the second light-transmissive layer 83 may be stacked on the upper surface of the upper electrode 60 which is opposite to the first light-transmissive layer 81.

The light-transmissive layer 80 may include any one of oxides, nitrides, salts, and composites thereof. In this case, the oxides may include $MoO_3$, ITO, IZO, IO, ZnO, TO, $TiO_2$, $SiO_2$, $WO_3$, $Al_2O_3$, $Cr_2O_3$, $TeO_2$, $SrO_2$, and the like. Further, the nitrides may include SiN, AlN, and the like. Further, the salts may include $Cs_2CO_3$, $LiCO_3$, $KCO_3$, $NaCO_3$, LiF, CsF, and ZnSe, and the like.

It is preferable that the oxides, the nitrides, the salts, and the composites thereof be used to form the light-transmissive layer 80, since these tend to provide excellent transmissivity and luminance effects.

Further, the first light-transmissive layer 81 and the second light-transmissive layer 83 of the light-transmissive layer 80 may be made of the same material, but may also be made of different materials. For example, the first light-transmissive layer 81 may include oxides and the second light-transmissive layer 83 may include nitrides, salts, and composites thereof. Alternatively, the first light-transmissive layer 81 may include nitrides and the second light-transmissive layer 83 may include oxides, salts, and composites thereof. Alternatively, the first light-transmissive layer 81 may include salts and the second light-transmissive layer 83 may include oxides, nitrides, and composites thereof.

In the screen for displaying information, at least any one of the lower electrode, the organic layer, and the upper electrode which form the transparent organic light-emitting device (TOLED) have a form corresponding to the form of the optical information display unit 20 and the set-up information display unit 30, such that the optical information display unit 20 and the set-up information display unit 30 may emit light.

As described above, the transparent organic light-emitting device (TOLED) which is a basis of the screen 1 for displaying information may be a form of an active matrix transparent organic light-emitting device (AM-TOLED) or a form of a passive matrix transparent organic light-emitting device (PM-TOLED).

Further, the transparent organic light-emitting device (TOLED) which is the basis of the screen 1 for displaying information according to the present invention may also be a TOLED having a flexible display type by using a graphene material. Therefore, the optical path of the corresponding optical device in which the screen for displaying information is installed may not be structurally restricted.

Further, the screen 1 for displaying information according to the present invention may be based on the transparent organic light-emitting device (TOLED) which may implement various colors. The optical information on the device set-up values of the optical device or the optically observed object may be implemented in various colors by using the TOLED. As a result, the usability, such as allowing the user to accurately recognize the corresponding information, is improved.

Figure 4:
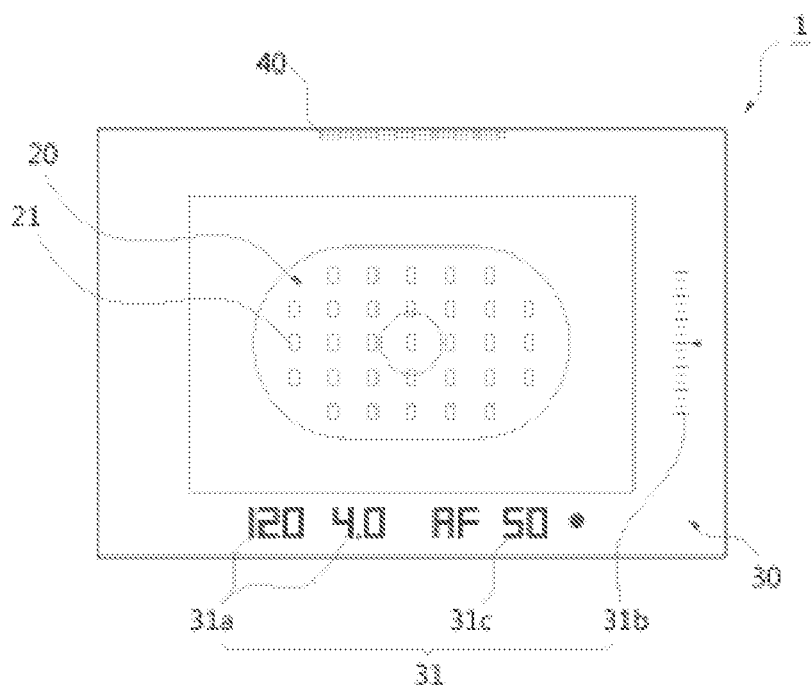
FIG. 4 is a plan view of a screen for displaying information for a camera according to an embodiment of the present invention.
Figure 5:
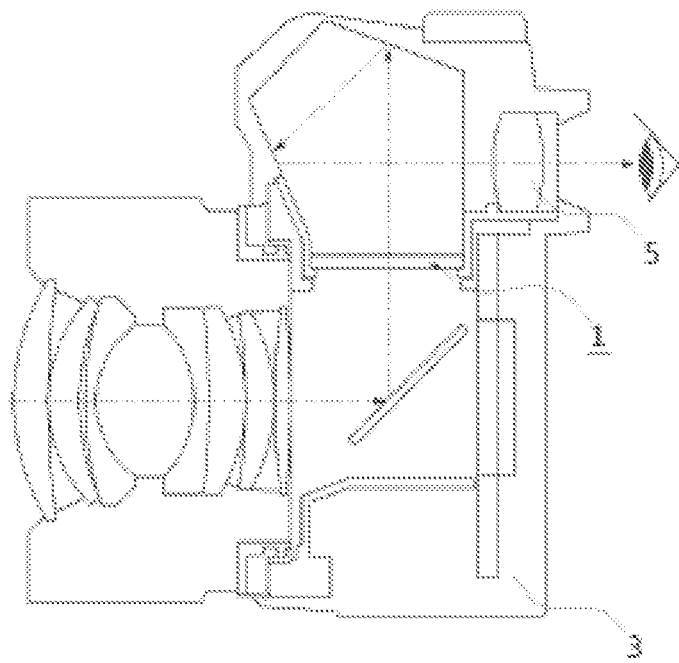
FIG. 5 is a schematic cross-sectional view of an SLR camera in which the screen for displaying information of FIG. 4 is installed.

As described above, an embodiment of the case in which the screen 1 for displaying information according to the present invention is applied to a camera 3 which is a representative example of the optical device is illustrated in FIGS. 4 and 5.

As illustrated in FIG. 4, the optical information display unit 20 may be formed by at least one focus point or a plurality of focus points 21 which are arranged in at least one central region of the screen 1 for displaying information. The focus point 21 may be formed in a pattern type and the focus point 21 selected depending on the power and the control signal transferred through the input unit 40 may emit light. In this case, transmission of the power and the control signal through the input unit 40 are carried out during a process of performing an operation of pressing a shutter button (not illustrated) of a camera or an operation of pressing the shutter button halfway and may be controlled by the same method as the control of the focus point 21 of the general camera 3.

Further, the set-up information display unit 30 may be provided at a region of a circumference of the screen 1 for displaying information and components forming the set-up information display unit 30 may include a plurality of photographing information display patterns 31 which include an exposure value display pattern 31a displaying an automatically measured exposure value or passively set at the time of the photographing of the camera, an exposure meter pattern 31b correcting exposure, a sensitivity display pattern 31c displaying photographing sensitivity, and the like, to display various kinds of photographing information including a light measuring mode, a frequency of photographing, a set-up value of the camera 3, and the like.

The set-up information display unit 30 also emits light in accordance with the power and the control signal transferred through the input unit 40 to display the set-up information of various devices. In this case, transmission of the power and the control signal through the input unit 40 are carried out during a process of operating the shutter button (not illustrated) of the camera 3, the aperture dial (not illustrated), the exposure time control dial (not illustrated), or the sensitivity control button (not illustrated), etc., and may be controlled by the same method as the control of the photographing information display of the general camera 3.

In this case, the set-up information display unit 30 may be formed at the region of the circumference of the screen 1 for displaying information similar to the general camera, but in some cases, the set-up information display unit 30 may be formed anywhere in the other region in which the optical information display unit 20 is not formed.

As described above, the input unit 40 transfers the control signal and the power transferred from the controller (not illustrated) and the power supply unit (not illustrated) to the optical information display unit 20 and the set-up information display unit 30 so as to emit light. The input unit 40 is connected to connecting terminals of the controller (not illustrated) and the power supply unit (not illustrated) of the camera 3 (not illustrated) when the screen 1 for displaying information according to the present invention is coupled to a mounting position inside the camera 3.

When the screen 1 for displaying information according to the present invention is applied to the camera, as illustrated in FIG. 5, the screen 1 for displaying information may be mounted in a region between a reflecting mirror and a pentaprism which is one region of the optical path inside the camera and in some cases, may also be mounted in one region on the optical path between a lens and a view finder of the camera other than the region between the reflecting mirror and the pentaprism.

Meanwhile, although not illustrated in drawings, the screen 1 for displaying information according to the present invention may be applied to various kinds of cameras. For example, the screen for displaying information may be applied to cameras, such as a single-lens reflex camera (SLR camera), a DSLR camera, a twin lens reflex camera, a range finder camera, and a mirrorless camera.

Further, the screen 1 for displaying information according to the present invention may also be applied to a moving picture photographing device, such as a camcorder, as another example of the optical device and be arranged in the optical path of a distance measuring device or other optical devices, such as various kinds of telescopes, magnifying glasses, telescopic sights, and a microscope which observes micro objects to be able to display the optical information, such as a position, a distance, a size, and the like, of an object which is the optically observed object and the device set-up values of the corresponding optical device.

Figure 6:
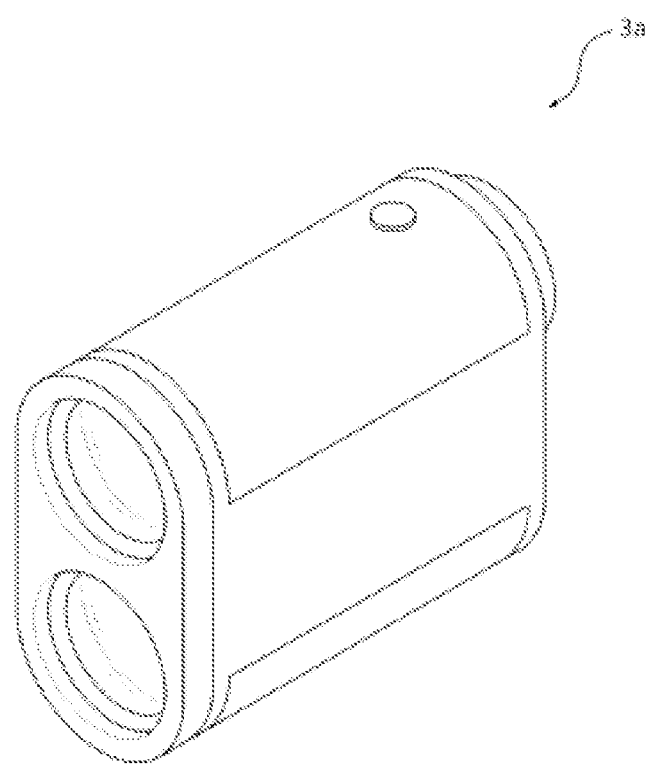
FIGS. 6 to 8 are perspective views illustrating an example of the optical device in which the screen for displaying information according to the present invention can be installed, respectively.

For example, as illustrated in FIG. 6, when the screen 1 for displaying information is arranged in the optical path of the distance measuring equipment 3a, the optical information display unit 20 may be a focus pattern or a sighting pattern to fit the focus or the position of the optically observed object of which the distance is to be measured, an emissive pattern which displays the measured distance or coordinate values, or the like. Further, the set-up information display unit 30 may light-emit and display the device set-up values, such as the measuring conditions of the optically observed object.

Figure 7:
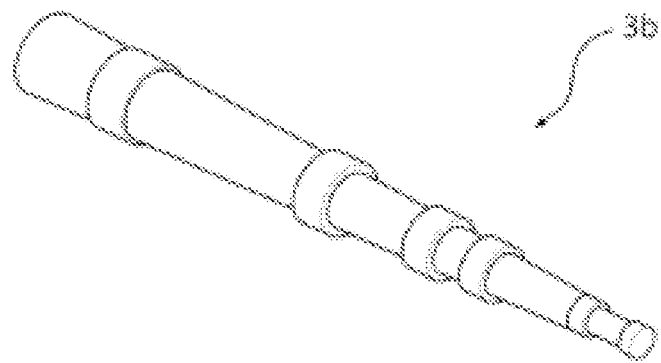
Figure 8:
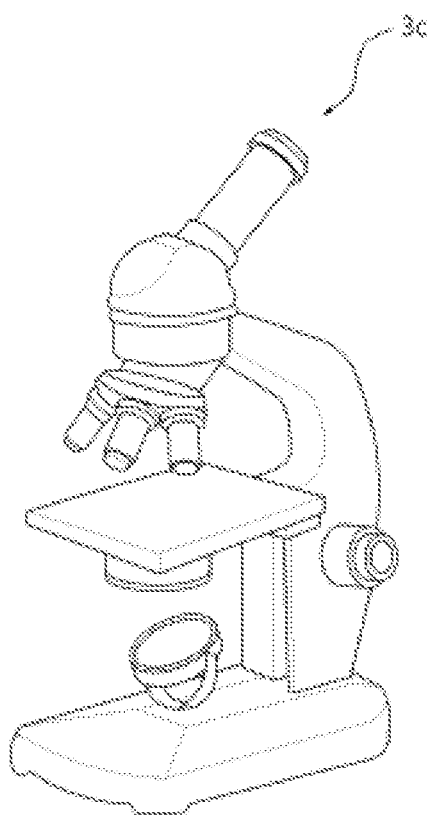

Alternatively, when the screen 1 for displaying information is arranged in the magnifying glass 3b or the telescopic sight (not illustrated), such as the telescope illustrated in FIG. 7 as an example, and in the microscope 3c illustrated in FIG. 8 as another example, and the like, the optical information display unit 20 may be a focus pattern or a sighting pattern to fit the focus or the position of the optically observed object and the set-up information display unit 30 may light-emit and display the device set-up values, such as conditions, for example, a measuring magnification, and the like of the optically observed object.

INDUSTRIAL APPLICABILITY

The screen for displaying information according to the present invention can display the set-up information display unit which light-emits and displays the use set-up values of the optical device based on the transparent organic light-emitting device (TOLED) and the optical information display unit which light-emits and displays the optical information on the optically observed object on the single information display screen, thereby reducing the number of parts configuring the optical device and simplifying the mechanical design inside the optical device due to the reduction in the number of parts.

Further, the screen for displaying information according to the present invention can thin the volume thereof depending on the thin film structure of the TOLED. Therefore, the structural and mechanical restriction of the photographing device at the time of installing the screen for displaying information can be solved.

Further, in the screen for displaying information according to the present invention, the set-up information display unit which light-emits and displays the use set-up values of the optical device based on the transparent organic light-emitting device (TOLED) and the optical information display unit which light-emits and displays the optical information on the optically observed object are transparently formed, such that the light-emitting display region may not be restricted and the visibility of the optically observed object may not deteriorate.

In addition, according to the present invention, since the screen for displaying information may be based on the transparent organic light-emitting device (TOLED) which can implement various colors, the optical information on the device set-up values of the optical device or the optically observed object can be implemented in various colors. As a result, the usability, such as allowing the user to accurately recognize the corresponding information, is improved.

The invention claimed is:

1. A screen for displaying information for an optical device, which is arranged within an optical path of the optical device and comprises:
   a transparent organic light-emitting device (TOLED) which is capable of emitting light when a control signal is present at an input to the TOLED,
   wherein the TOLED includes:
   (i) a transparent substrate;
   (ii) a lower electrode which is formed on the substrate to receive a power and the control signal;
   (iii) an organic layer which is formed on the lower electrode;
   (iv) a first light-transmissive layer which is formed on the organic layer;
   (v) an upper electrode which is formed on the first light-transmissive layer to receive the control signal; and
   (vi) a second light-transmissive layer which is formed on the upper electrode,
   wherein the (i), (ii), (iii), (vi), (v), and (vi) are stacked in this order,
   wherein the first light-transmissive layer (iv) and the second light-transmissive layer (vi) each include at least one selected from the group consisting of an oxide, nitride, salt, and a composite thereof, and
   wherein the first light-transmissive layer (iv) and the second light-transmissive layer (vi) are made of different materials from each other.

2. The screen for displaying information for an optical device of claim 1, further comprising: a set-up information display unit which emits light and displays use set-up values of the optical device.

3. The screen for displaying information for an optical device of claim 1, further comprising: an optical information display unit which emits light and displays optical information on an optically observed object transferred through the optical path.

4. The screen for displaying information for an optical device of claim 3, further comprising: a set-up information display unit which emits light and displays the use set-up values of the optical device.

5. The screen for displaying information for an optical device of claim 4, wherein the optical information display unit is disposed in one region of the screen for displaying information, and
   the set-up information display unit is disposed in other region of the screen for displaying information than the region where the optical information display unit is disposed.

6. The screen for displaying information for an optical device of claim 4, wherein the optical information display unit displays focus or position information on the optically observed object.

7. The screen for displaying information for an optical device of claim 1, wherein one region of a circumference of the screen is provided with an input unit to which the power and the control signal are input.

8. The screen for displaying information for an optical device of claim 1, wherein the lower electrode is made of indium tin-oxide or indium zinc-oxide which has light transparency.

9. The screen for displaying information for an optical device of claim 1, wherein the upper electrode is made of any one of silver, aluminum, and an alloy of magnesium and silver), all of which have light transparency.

10. The screen for displaying information for an optical device of claim 1, wherein the organic layer has a hole injection layer, a hole transporting layer, an emissive layer, an electron transporting layer, and an electron injection layer which are mutually stacked between the lower electrode and the upper electrode.

11. The screen for displaying information for an optical device of claim 10, wherein the electron transporting layer includes a metal selected from the group consisting of Cs, Li, Na, K, Ca, Li—Al, LiF, CsF, and $Cs_2CO_3$.

12. The screen for displaying information for an optical device of claim 1, wherein the oxide is selected from the group consisting of $MoO_3$, ITO, IZO, IO, ZnO, TO, $TiO_2$, $SiO_2$, $WO_3$, $Al_2O_3$, $Cr_2O_3$, $TeO_2$, and $SrO_2$.

13. The screen for displaying information for an optical device of claim 1, wherein the nitride is any one of SiN and AlN.

14. The screen for displaying information for an optical device of claim 1, wherein the salt is selected from the group consisting of $Cs_2CO_3$, $LiCO_3$, $KCO_3$, $NaCO_3$, LiF, CsF, and ZnSe.

15. The screen for displaying information for an optical device of claim 1, wherein the TOLED is an active matrix transparent organic light-emitting device or a passive matrix transparent light-emitting device.

16. The screen for displaying information for an optical device of claim 1, wherein the TOLED is a TOLED which implements at least one color.

17. The screen for displaying information for an optical device of claim 1, wherein the optical device is selected from the group consisting of a photographing device, a distance measuring equipment, a magnifying glass, and a microscope.

18. The screen for displaying information for an optical device of claim 1, wherein the screen for displaying information is provided as a flexible display.

* * * * *